Nov. 12, 1968 B. HURKO ETAL 3,410,987
ELECTRIC BAKING OVEN WITH A FRONT HEATING ELEMENT
Filed May 12, 1966
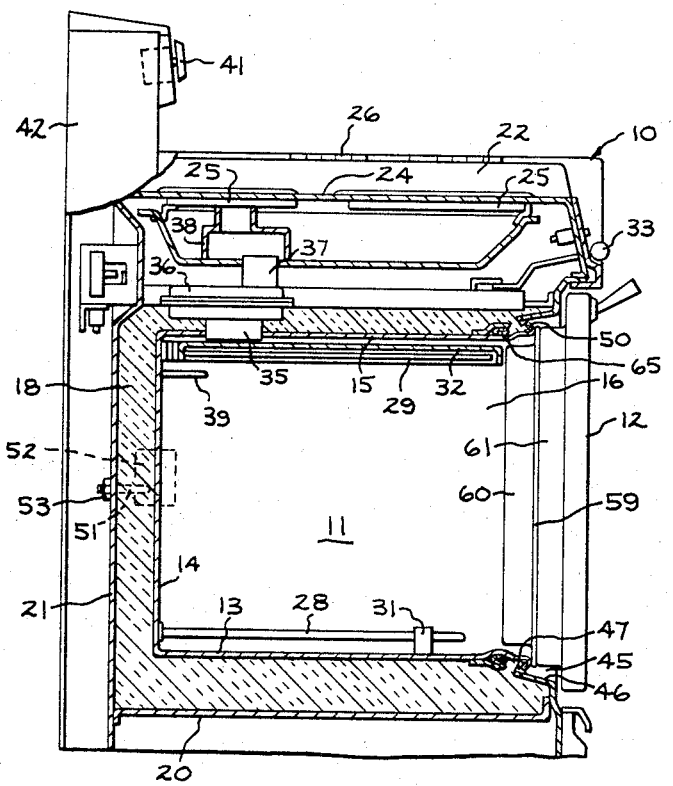
FIG.1
FIG.3
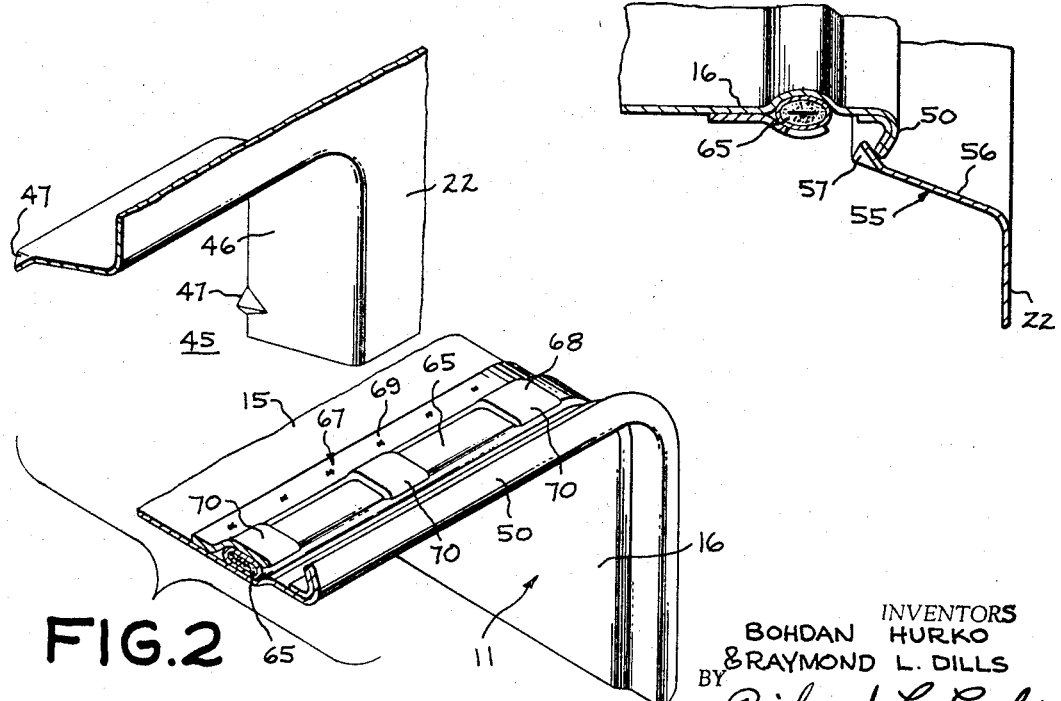
FIG.2
INVENTORS
BOHDAN HURKO
& RAYMOND L. DILLS
BY Richard L. Caslin
THEIR ATTORNEY

United States Patent Office 3,410,987
Patented Nov. 12, 1968

3,410,987
ELECTRIC BAKING OVEN WITH A
FRONT HEATING ELEMENT
Bohdan Hurko and Raymond L. Dills, Louisville, Ky., assignors to General Electric Company, a corporation of New York
Filed May 12, 1966, Ser. No. 549,590
3 Claims. (Cl. 219—397)

The present invention relates to ovens for cooking foods, and particularly to a supplementary heating means adjacent the front portion of the oven for obtaining generally uniform oven wall temperatures by compensating for the heat lost through and around the oven door.

This invention is related to the automatic, self-cleaning oven using a pyrolytic process in a high temperature range, preferably between about 750° F. and about 950° F., disclosed and claimed in the patent of Bohdan Hurko No. 3,121,158 which is assigned to the General Electric Company, the assignee of the present invention. One of the many important features conceived by Hurko was the use of an additional heating means or mullion heater adjacent the front of the oven liner for compensating for heat lost through and around the oven door during the heat cleaning cycle.

The present invention involves an improvement in the tension mounting means of the front heating element or mullion heater of Patent No. 3,017,488 of J. K. Newell, Jr., which is another patent in this art that is assigned to the assignee of the present invention. In the Newell design the mullion heater is captured between a front flange of the oven liner and a rear flange of a separate breaker frame which is interposed between the oven liner and the front opening in the range body. There are widely spaced bumps of limited areas of contact between the rear edge of the breaker frame and the mullion heater so as to reduce the heat flow from the breaker frame into the range body.

The principal object of the present invention is to provide an oven with a front heating element that is so fastened to the oven liner by means of a heat sink that it is possible to eliminate the need for a separate breaker frame interposed between the oven liner and the front of the range body.

A further object of the present invention is to provide an oven with a front heating means that cooperates with a strap means for dividing the heat path so that the heat flow from the oven liner to the range body is retarded, while at the same time the heat tends to remain in the front of the oven liner.

A still further object of the present invention is to provide an oven having a supplementary heating means in the front thereof with a temperature controlling means for governing the heat path generated thereby.

The present invention, in accordance with one form thereof, is embodied in an oven having a box-like oven liner with a front opening that is adapted to be closed by an oven door. The oven is supported in an oven body insulated therefrom by a thick blanket or thermal insulation. The oven liner is supported in the oven body from the front edge of the oven liner where there is limited area contact therebetween so as to create a break in the heat path. A supplemental heating means is supplied to the oven liner adjacent the front thereof but spaced rearwardly of the front edge. This heating element is held down to the oven liner with a special fastening means that is capable of controlling the heat flow in such a way as to draw heat from the heating element in a direction away from the front of the oven liner so as to reduce the conduction of heat into the front of the oven body.

Our invention will be better understood from the following description taken in conjuction with the accompanying drawings and its scope will be pointed out in the appended claims.

FIG. 1 is a fragmentary left-side elevational view of an electric range having an oven embodying the present invention with some parts broken away and others in cross-section to show the principal elements.

FIG. 2 is a fragmentary exploded view of details of the front edge of the oven liner as well as the front opening in the range body giving the best showing of the heat sink that is used for fastening the supplementary heating means to the oven liner.

FIG. 3 is a modification of the oven of FIGS. 1 and 2 showing a breaker frame adapted to be interposed between the front of the oven liner and the range body.

Turning now to a consideration of the drawings and in particular to FIG. 1, there is shown an electric range 10 having as its principal component a box-like oven liner 11 in combination with a front-opening access door 12 which form an oven cooking cavity. The oven liner 12 is of sheet metal construction having a bottom wall 13, back wall 14, top wall 15 and opposite side walls 16, 16. The front of the oven liner is open and it is adapetd to be closed by the door 12 as is clearly illustrated.

As in standard oven designs, a layer of termal insulating material 18 such as fiber glass or the like completely surrounds the oven liner on all five sides and serves to retain the heat present in the oven cavity so as to render the system thermally efficient. A sheet metal insulation guard 20 is positioned beneath the oven for supporting the insulation, and similar vertical panels 21, as seen at the back of the oven, support the insulation at the back and the two sides. The oven is further provided with an outer casing or oven body 22 of decorative finish, such as porcelain enamel, to enclose the entire assembly.

This invention is shown as being built into a complete range having a top cooking surface or cooktop 24 assembled over the oven and including a plurality of surface heating units 25 formed of metal sheathed resistance heating elements, as is conventional in this art. Each surface heating unit 25 is provided with a multiple push-button selector switch 26 along one side edge of the cooktop 24 for controlling the amount of heating energy available. The oven cavity is provided with two heating elements; namely, a lower baking element 28 and an upper broiling element 29, which are each in the form of a metal sheathed resistance heating element that is bent into a large loop and is provided with two terminal ends which extend through the back wall 14 of the oven liner for making electrical connections therewith. The baking element 28 is provided with a plurality of supporting clips or feet 31 for holding the baking element raised off of the bottom wall 13 so as not to develop hot spots that might otherwise damage the porcelain enamel finish which covers the interior surface of the oven liner. The upper broiling element 29 is provided with a pan-shaped reflector 32 which overlies the broiling element and serves to direct the radiant energy downwardly into the oven cavity as well as to shield the upper wall 15 of the oven liner from the intense heat.

As in standard baking and broiling ovens, the oven cavity would be provided with one or more oven racks that are adapted to be supported on rack-supporting embossments or shelves, but these are not illustrated in the drawing since they do not form part of the present invention. The oven door 12 is made of sheet metal panels that are fastened together in a unitary structure, and its interior is substantially full of thermal insulated material (not shown) such as fiber glass or the like so that the oven heat is retained within the cooking cavity for obtaining uniform cooking results no matter where the food might be placed within the oven.

Other elements illustrated in the drawing but which do not form a part of the present invention will be listed here briefly for ease in understanding the embodiment in which the present invention is located. First, there is a door latch handle 33 which is used for locking the oven door 12 during a high temperature heat cleaning of the oven walls. This is best illustrated in the patent of Clarence Getman 3,189,375 which is assigned to the General Electric Company the assignee of the present invention. Next, the oven cavity is provided with a venting system at the rear thereof having a duct 35 in the top wall 15 of the oven liner so that the gaseous products formed during cooking and cleaning may be exhausted to the outside of the oven. Interposed in this exhaust duct 35 is a catalytic oxidation unit 36 which serves both as a smoke and odor eliminator. There is an exhaust port 37 from the oxidation unit and it discharges into a labyrinth formed by duct work 38 which eventually discharges beneath one of the rear surface heating units 25 of the cooktop 24. Preferably, an oxidation unit will be used such as is disclosed and claimed in the patent of Stanley B. Welch 2,900,483, which patent is assigned to the General Electric Company the assignee of the present invention.

A standard oven thermostatic control comprises a temperature sensor such as a probe 39 which is mounted on the top portion of the back wall 14 of the oven liner and would comprise a tubular member with a nickel or platinum resistance wire which is electrically connected back to a responder, shown diagrammatically in FIGURE 1 as element 41, that is assembled in a control panel of a backsplasher 42 arranged along the rear edge of the cooktop 24.

Mention will now be made of the technique of supporting the oven liner 11 in the range body. As seen in FIGURE 1, the front panel of the range body 22 is provided with a large opening 45 that is framed by an inwardly turned converging flange 46. A plurality of widely spaced inner embossments or bumps 47 are formed on the innermost edge of the flange 46 to represent points of restricted thermal conduction with the oven liner 11. For example, there might be two bumps on each side of the opening flange 46, a total of eight bumps. However, this number is not critical as long as the theory is understood to have the least amount of thermal conduction as is mechanically feasible for proper support.

As mentioned previously, the front of the oven liner 11 is open for receiving the oven door 12 therein. The front edge is formed with an outwardly turned lip 50 which is rolled over and doubled under as is best seen in FIGURE 2. This forms a reinforced flange that is capable of engaging the bumps or embossments 47 on the perimeter of the front opening of the range body when a tension force is applied to the back of the oven liner. This tension force is provided by the cooperation between a J-bolt 51 and a bracket member 52 that is fixed to the back of the two side walls 16 for engagement by the J-bolts. Adjustment or tension is applied to the bolt by means of a nut 53 for each bolt, and this tension force pulls the oven liner into the range body until stability is obtained and the oven liner is immovable during handling and shipment, as well as during the use of the range. This method is quite similar to the method of supporting the oven liner in standard ovens except for the reduced area of contact between the flange or lip and the range front panel by means of the embossments 47.

Referring to the design of the patent of Hurko 3,121,158 there was a breaker frame interposed between the front of the oven liner and the range body. A similar breaker frame is shown as element 55 in the second modification of FIGURE 3 where the breaker frame is provided with an inwardly converging flange 56 having widely spaced embossments or bumps 57 for engagement by the lip or flange 50 of the front of the oven liner.

Notice in FIGURE 1 that the frontmost portion of the flange 50 is adapted to bear against a high temperature gasket 59 which is part of the oven door structure 12 and is interposed between a floating inner liner 60 and the inner panel 61 of the door. This gasket serves both as a heat break between these two panels 60 and 61 as well as an oven sealing means with the flange 50 of the front of the oven liner. This door structure is best illustrated in a patent to Clarence Getman No. 3,189,020 which is assigned to General Electric Company, the assignee of the present invention.

Turning attention to FIGURE 2, a supplementary heating element 65 in the form of a metal-sheathed resistance heating element is wound around the front of the oven liner in a plane that is spaced rearwardly from the front flange 50. A preferred embodiment is one wherein the heating element 65 is flattened into an oval or at least a shape that has a large surface area in engagement with the oven liner. The shape could be an oval shape or it might be a triangular shape or semi-circular cross-sectional shape. In any event, it is preferable to have an area of contact that is greater than a line contact as is depicted in the Hurko Patent 3,121,158. This supplementary heating element 65 has been described in the art as a mullion or perimeter heater that has been assembled adjacent the front edge of the oven liner for supplementing heat lost through and around the oven door, primarily to insure that there will be no cool spots on the walls of the oven cavity to form a temperature gradient larger than 300° F. or 400° F. Otherwise thermal shock might cause crazing or cracking of the porcelain enamel that covers the inner surface of the oven cavity.

FIGURE 1 of the drawing shows a design of a high temperature self-cleaning oven where the breaker frame such as element 55 in FIGURE 3 has been eliminated for reasons which will be explained as follows. First, the oven is supported by bumps or embossments 57 on the throat of the front opening 45 in the range body. The mullion heater 65 is out of contact with this supporting arrangement as it has been set back from the flange 50. This mullion heater 65 is fastened in place by a strap means 67. This strap 67 might be a single piece that is wound around the oven liner in the manner of the mullion heater 65. However, for purposes of simplicity it might best be formed in four sections, one section for each wall 13, 15, 16 and 16 of the oven liner. The strap means has two portions, a first portion 68 which overlies the mullion heater and a second portion 69 which is in contact with the oven liner on the side of the heater 65 that is remote from the flange 50. This strap 67 is designed to serve two purposes; namely, as a fastening means for the mullion heater 65 as well as for a heat sink that is especially desgined to draw heat from the mullion heater in a direction away from the flange 50 of the oven liner toward the back of the oven. This is desirable so as to restrict the amount of heat conducted from the mullion heater through the front flange 50 and into the range body while at the same time retaining a satisfactory amount of heat for cleaning the inner panel 60 of the oven door. It has been found by experience that this invention makes it possible to utilize a smaller wattage mullion heater to eliminate the need for a breaker frame, and still maintain an even temperature distribution at the front of the oven cavity.

This strap 67 is able to serve as a heat sink primarily for two reasons; namely, the first portion 68 of the strap is of reduced planar area as for example, being formed by a plurality of spaced giners 70 which are widely spaced from each other by a distance of about three inches and having a width of about an inch so that they do not pick up too much heat from the heating element. Moreover, the second portion 69 of the strap is in good heat transfer relation with the walls of the oven liner as by being welded thereto and being of much larger planar area than the first portion 68.

Modifications of this invention will occur to those skilled in this art, therefore, it is to be understood that this invention is not limited to the particular embodimens disclosed but that it is intended to cover all modifications which are within the true spirit and scope of this invention as claimed.

What we claim as new and desire to secure by Letters Patent of the United States is:

1. An oven comprising a box-like oven liner having a front opening, an oven door for closing the oven liner opening and forming an oven cavity, first heating means for raising the temperature within the oven cavity, second heating means in the vicinity of a gap between the peripheral edge of the door and the front edge of the walls of the oven liner for replenishing heat lost through and around the door, said second heating means extending around the oven liner and being set back from said front edge of the walls of the oven liner, a hold-down strap of substantially the same length as the second heating means and overlying the same, said strap having a heat sink portion that is permanently fastened to the oven liner on the side remote from the said front edge, the area of the strap overlying the second heating means being of reduced area of predetermined size so as to govern the direction and amount of flow of heat from the second heating means toward and away from the front edge of the oven liner.

2. An oven comprising an oven liner of box-like construction and an open front, said liner being supported in an oven body and insulated therefrom by a thick blanket of thermal insulation, an outwardly turned lip formed on the front edge of the liner, the oven body having a front opening for receiving the oven liner therethrough, a series of widely spaced bumps disposed around the said front opening and for engagement by the lip of the oven liner, tension means in the rear of the oven for supporting the oven liner in the oven body with the lip in slight thermal engagement with the said bumps, a resistance heating element encircling the front of the oven liner and spaced rearwardly of the lip, strap means for holding the heating element firmly against the oven liner, a first portion of the strap means overlying the heating element and a second portion being on the side remote from the lip and in good heat transfer relation with the liner, said first portion being of reduced planar area so as to draw a predetermined amount of heat from the heating element and conduct it away from the oven liner lip and hence the oven body.

3. An oven construction comprising an outer oven body having a box-like oven liner and a front-opening door forming an oven cooking cavity, a blanket of thermal insulating material surrounding the oven liner, the oven body having a front opening for receiving the oven liner therethrough, the front edge of the oven liner having an outwardly turned flange, tension means at the rear of the oven for holding the oven liner in the oven body with the said flange in engagement with surrounding portions of the said front opening, and areas of reduced cross-section located between the oven liner and the sides of the range body so as to reduce the conduction of heat energy from the oven liner to the range sides, a resistance heating element encircling the front of the oven liner, but spaced rearwardly from the said flange, the said heating element being of generally flattened, oval, cross-section, strap means for holding the heating element in place against the oven liner, a first portion of the strap means overlying the heating element and a second portion being on the side of the heating element that is remote from the said flange, the said first portion being in the form of a series of widely spaced fingers while the said second portion is permanently fastened directly to the oven liner, whereby the strap means serves to draw a predetermined amount of heat away from the oven liner flange so as to reduce the heat flow from the heating element to the front of the oven body.

References Cited

UNITED STATES PATENTS

| | | | |
|---|---|---|---|
| 3,017,488 | 1/1962 | Newell | 219—406 |
| 3,053,963 | 9/1962 | Dills | 219—413 |
| 3,082,311 | 3/1963 | Chisholm | 219—413 |
| 3,121,158 | 2/1964 | Hurko | 219—397 |
| 3,270,183 | 8/1966 | Jordan | 219—398 |
| 3,293,410 | 12/1966 | Welch | 219—393 |
| 3,350,542 | 10/1967 | Getman | 219—412 |

BERNARD A. GILHEANY, *Primary Examiner.*

VOLODYMYR Y. MAYEWSKY, *Assistant Examiner.*